(12) United States Patent
Moribe

(10) Patent No.: US 12,460,994 B2
(45) Date of Patent: Nov. 4, 2025

(54) ABNORMALITY DETECTION DEVICE

(71) Applicant: DENSO CORPORATION, Kariya (JP)

(72) Inventor: Atsushi Moribe, Kariya (JP)

(73) Assignee: DENSO CORPORATION, Kariya (JP)

( * ) Notice: Subject to any disclaimer, the term of this patent is extended or adjusted under 35 U.S.C. 154(b) by 1133 days.

(21) Appl. No.: 17/388,505

(22) Filed: Jul. 29, 2021

(65) Prior Publication Data

US 2021/0357727 A1 Nov. 18, 2021

Related U.S. Application Data

(63) Continuation of application No. PCT/JP2019/050704, filed on Dec. 24, 2019.

(30) Foreign Application Priority Data

Feb. 7, 2019 (JP) .................. 2019-021084

(51) Int. Cl.
| | |
|---|---|
| G06N 3/044 | (2023.01) |
| G01M 17/007 | (2006.01) |
| G05B 23/02 | (2006.01) |
| G06F 18/2133 | (2023.01) |
| G06F 18/214 | (2023.01) |
| G06N 3/045 | (2023.01) |
| G06N 3/08 | (2023.01) |

(52) U.S. Cl.
CPC ........... G01M 17/007 (2013.01); G05B 23/02 (2013.01); G06F 18/2133 (2023.01); G06F 18/214 (2023.01); G06N 3/044 (2023.01); G06N 3/045 (2023.01); G06N 3/08 (2013.01)

(58) Field of Classification Search
CPC .. G01M 17/007; G05B 23/02; G06F 18/2133; G06F 18/214; G06F 18/2433; G06N 3/044; G06N 3/045; G06N 3/08; F02D 45/00

See application file for complete search history.

(56) References Cited

U.S. PATENT DOCUMENTS

| | | | |
|---|---|---|---|
| 10,496,515 B2 * | 12/2019 | Maya | G06N 20/00 |
| 10,605,188 B2 * | 3/2020 | Matsumoto | G06N 3/08 |
| 10,816,951 B2 * | 10/2020 | Abe | G05B 19/058 |
| 2008/0301077 A1 * | 12/2008 | Fung | G16H 50/20 |
| | | | 706/46 |
| 2012/0277949 A1 | 11/2012 | Ghimire et al. | |
| 2016/0310046 A1 * | 10/2016 | Heinrich | A61B 5/4818 |
| 2017/0287125 A1 * | 10/2017 | Tanaka | G06T 7/0002 |

(Continued)

FOREIGN PATENT DOCUMENTS

| | | | |
|---|---|---|---|
| JP | 2007198918 A | | 8/2007 |
| JP | 4832609 B1 | | 12/2011 |

(Continued)

*Primary Examiner* — Sohana Tanju Khayer
(74) *Attorney, Agent, or Firm* — Harness, Dickey & Pierce, P.L.C.

(57) ABSTRACT

An abnormality detection device, method, or a storage medium acquires learning target data and monitoring target data, generates a state observer by using a variable in an input variable configuration, generates a threshold, calculates an abnormality degree by combining a second state observation value and the monitoring target data and inputting a combined result to the competitive neural network, and calculates a determination result.

17 Claims, 8 Drawing Sheets

(56) References Cited

U.S. PATENT DOCUMENTS

| | | | |
|---|---|---|---|
| 2018/0172624 A1* | 6/2018 | Aoki | G01N 27/4074 |
| 2018/0231493 A1* | 8/2018 | Aoki | G01N 27/123 |
| 2018/0276569 A1 | 9/2018 | Oguri | |
| 2019/0301979 A1* | 10/2019 | Kawanoue | G05B 23/0216 |
| 2019/0308640 A1* | 10/2019 | Miller | B60W 30/182 |
| 2020/0019852 A1 | 1/2020 | Yoon et al. | |
| 2020/0039454 A1* | 2/2020 | Hsieh | B60L 3/0061 |
| 2020/0150159 A1* | 5/2020 | Takeda | G01R 19/2506 |
| 2020/0162642 A1* | 5/2020 | Oniki | H04N 23/90 |
| 2020/0334554 A1* | 10/2020 | Takahashi | G06F 11/3058 |
| 2020/0376667 A1* | 12/2020 | Götvall | B25J 9/1602 |
| 2023/0128023 A1 | 4/2023 | Moribe | |

FOREIGN PATENT DOCUMENTS

| | | |
|---|---|---|
| JP | 2014518580 A | 7/2014 |
| JP | 2015018389 A | 1/2015 |
| JP | 2017102826 A | 6/2017 |
| JP | 2017192277 A | 10/2017 |
| KR | 101940029 B1 | 1/2019 |
| WO | WO-2018230645 A1 | 12/2018 |

* cited by examiner (a)

(b)

ABNORMALITY DETECTION DEVICE

CROSS REFERENCE TO RELATED APPLICATIONS

The present application is a continuation application of International Patent Application No. PCT/JP2019/050704 filed on Dec. 24, 2019, which designated the U.S. and claims the benefit of priority from Japanese Patent Application No. 2019-021084 filed on Feb. 7, 2019. The entire disclosures of all of the above applications are incorporated herein by reference.

TECHNICAL FIELD

The present disclosure relates to a device that detects an abnormality of an instrument or a sign of the abnormality, particularly, an abnormality of a transportation equipment such as an automobile, an agricultural equipment, a construction equipment, or a sign of the abnormality, by using a competitive neural network.

BACKGROUND

In recent years, it has been proposed that an abnormalities of various instruments are detected using machine learning. The machine learning can be said to be an intelligent system that has a characteristic of being able to improve its detection accuracy. In particular, the neural network is modeled by focusing on a characteristic function of a neural function of a living thing, and the usefulness has been recognized.

For example, in a first comparative example, a competitive neural network is used for a rotating device, or an equipment. In the first comparative example, an abnormality monitoring device appropriately diagnoses the presence or absence of the abnormality by evenly learning actual sensor observation values even when a normal state varies depending on the rotation speed, aging deterioration, data and time, season, and the like. Further, in a second comparative example, an abnormality sign diagnosis device generates a normal model by using the machine learning and an actual sensor value, detects an abnormality based on a threshold determination, and reconstructs the entire normal model in accordance with a change in an external environment.

SUMMARY

An abnormality detection device, method, or a storage medium acquires learning target data and monitoring target data, generates a state observer by using a variable in an input variable configuration, generates a threshold, calculates an abnormality degree by combining a second state observation value and the monitoring target data and inputting a combined result to the competitive neural network, and calculates a determination result.

DETAILED DESCRIPTION

Figure 1:
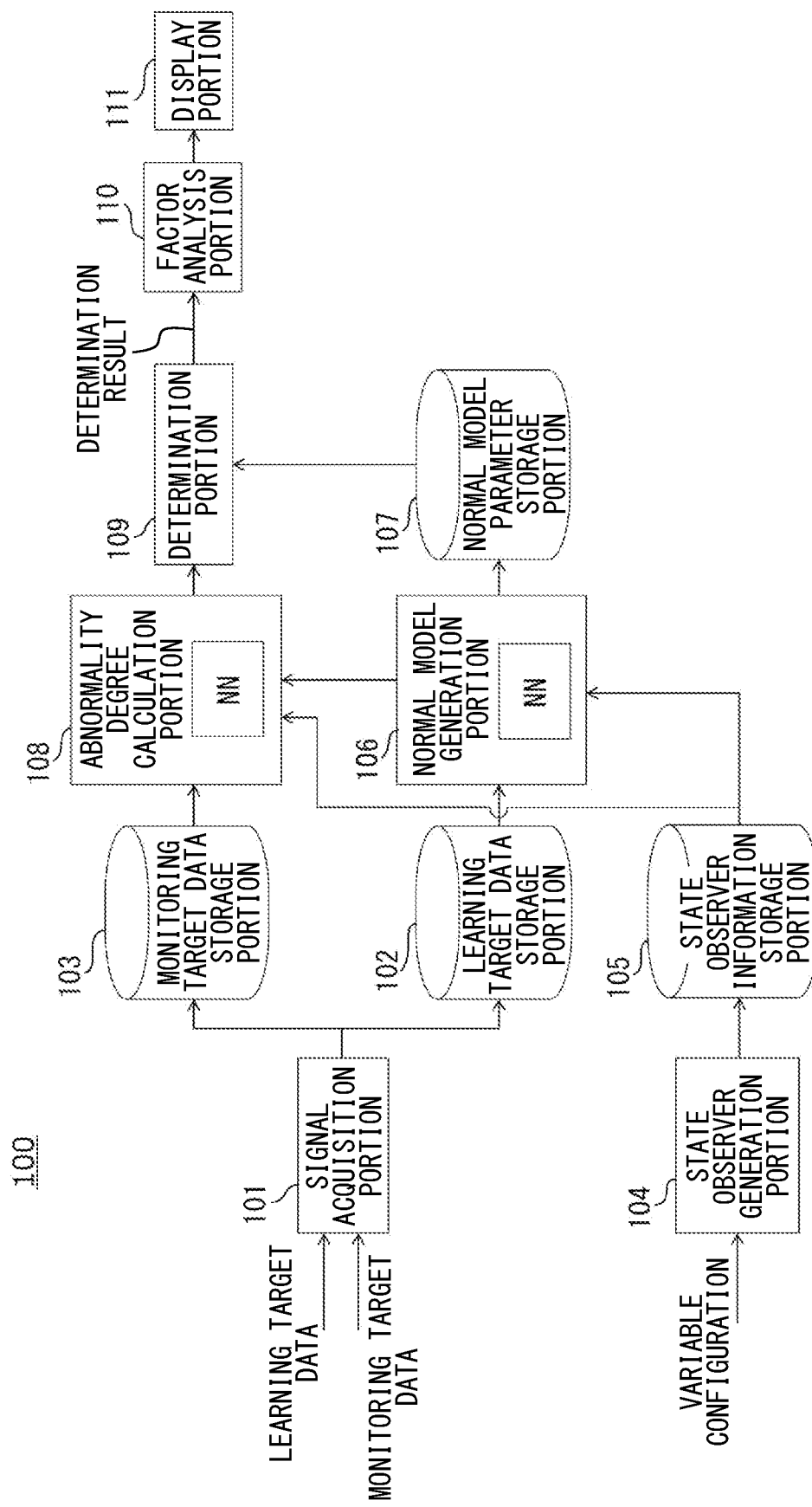
FIG. 1 is a block diagram illustrating a configuration of an abnormality detection device according to an embodiment.

As the result of detailed examination by the present inventor, when a threshold for detecting an abnormality is obtained from information read form an observation value of an actual sensor or a characteristic, erroneous determination that the abnormality is determined to be normal is likely to occur due to the change in the external environment. Further, it is found that there is a difficulty that, when learning proceeds in no consideration of the device function or the malfunction mechanism, the learning proceeds in an undesired direction and causes a deviation from a device function or a malfunction mechanism.

The present disclosure provides a device, a method, and a program for detecting an abnormality with high accuracy by learning after reflecting a device function or a malfunction mechanism.

According to one example embodiment, an abnormality detection device includes: a signal acquisition portion that acquires learning target data and monitoring target data; a state observer generation portion that generates a state observer by using a variable in an input variable configuration; a normal model generation portion that generates a threshold by combining a first state observation value obtained by input of the learning target data to the state observer and the learning target data and inputting a combined result to a competitive neural network; an abnormality degree calculation portion that calculates an abnormality degree by combining a second state observation value obtained by input of the monitoring target data to the state observer and the monitoring target data and inputting a combined result to the competitive neural network; and a determination portion that calculates a determination result by comparing the threshold with the abnormality degree.

According to another example embodiment, an abnormality detection method includes: acquiring learning target data; generating a state observer by using a variable in an input variable configuration; generating a threshold by combining a first state observation value obtained by input of the learning target data to the state observer and the learning target data and inputting a combined result to a competitive neural network; acquire monitoring target data; calculating the abnormality degree by combining a second state observation value obtained by input of the monitoring target data to the state observer and the monitoring target data and inputting a combined result to the competitive neural network; and calculating a determination result by comparing the threshold with the abnormality degree.

According to another example embodiment, an abnormality detection program executable by a computer acquires learning target data, generates a state observer by using a variable in an input variable configuration, generates a threshold by combining a first state observation value obtained by input of the learning target data to the state observer and the learning target data and inputting a combined result to a competitive neural network, acquires monitoring target data, calculates the abnormality degree by combining a second state observation value obtained by input of the monitoring target data to the state observer and the monitoring target data and inputting a combined result to the competitive neural network, and calculates a determination result by comparing the threshold with the abnormality degree.

According to the abnormality detection device, the abnormality detection method, and the abnormality detection program of the present disclosure, it is possible to detect the abnormality with high accuracy by reflecting the device function or the malfunction mechanism with use of a state observer and calculating the abnormality degree with use of the competitive neural network based on the reflection. Further, by using such a state observer, it is possible to analyze which function of the device or part of the device the abnormality occurs in or whether the abnormality is likely to occur.

The following will describe embodiments of the present disclosure with reference to the drawings. The present invention referred hereinafter indicates the invention described in the claims, and is not limited to the following embodiments. Further, at least words within the double quotation mean words and phrases described in claims, and are not limited to the following embodiment. Configurations and methods described in dependent claims of claims, configurations and methods of the following embodiment corresponding to the configurations and the methods described in the dependent claims, and the configurations and the methods described only in the following embodiment without descriptions in claims should be interpreted as arbitrary configurations and arbitrary methods in this invention. In a case that the scope of claims is broader than descriptions of the embodiment, configurations and methods described in the following embodiment only show examples of configurations and methods of the present invention, which should be interpreted as arbitrary configurations and arbitrary methods in the present invention. In any cases, essential configurations and methods of the present invention should be interpreted based on independent claims.

Any effects described in the embodiment are effects obtained by configurations of the embodiment as an example of this invention, and are not necessarily effects of this disclosure. When there are multiple embodiments, a configuration disclosed in each embodiment is not limited to each embodiment, but can be combined across embodiments. For example, a configuration disclosed in one embodiment may be combined with other embodiments. Configurations disclosed the respective multiple embodiments may be collected and combined. Findings or difficulties described in this disclosure are not publicly known, but the inventor has independently found out them. The findings or difficulties are facts that affirm the inventive step of the invention together with the configuration and method of the present disclosure.

Embodiment

1. Configuration of Abnormality Detection Device

First, with reference to FIG. 1, a configuration of an abnormality detection device 100 (corresponding to "abnormality detection device") of the present embodiment will be described. In the following embodiment, an in-vehicle abnormality detection device mainly mounted on an automobile will be described as an example. However, the present invention includes a vehicle abnormality detection device other than an in-vehicle abnormality detection device unless the claims are limited. For example, the vehicle abnormality detection device is an abnormality detection device placed outside a vehicle, and used in a state of being connected to a connected ECU of the vehicle by wire or wireless. Further, the following embodiment includes an abnormality detection device other than the in-vehicle abnormality detection device and the vehicle abnormality detection device. Here, the "abnormality detection device" includes not only a device that detects an abnormality but also a device that detects an abnormality sign such as a sign of a malfunction.

An abnormality detection device 100 includes a signal acquisition portion 101, a learning target data storage portion 102, a monitoring target data storage portion 103, a state observer generation portion 104, a state observer information storage portion 105, a normal model generation portion 106, a normal model parameter storage portion 107, an abnormality degree calculation portion 108, a determination portion 109, a factor analysis portion 110, and a display portion 111.

The signal acquisition portion 101 acquires "learning target data" and "monitoring target data". Specifically, the data is data acquired from various sensors directly or indirectly connected to the signal acquisition portion 101, for example, an engine rotation speed, a turbine rotation speed, an oxygen sensor voltage, an air-fuel ratio sensor current, or the like. In addition, the data is temperature, humidity, position information, or the like. The learning target data and the monitoring target data can be acquired not only directly from various sensors but also indirectly via a network. For example, in a case of the learning target data, the learning target data may be acquired by downloading from database storing a reference value instead of acquisition from various sensors. Further, the learning target data is not limited to the data acquired by the signal acquisition portion 101 with the sensors, and, for example, may be a control input value. Here, the "learning target data" may be data for learning, and it is arbitrary whether the data is used for other purposes. Further, the "monitoring target data" may be data for monitoring target, and it is arbitrary whether the data is used for other purposes. For example, the monitoring target may be data for the learning target.

Examples of various sensors includes, in addition to thermometers, hygrometers, GPS, and the like, a sensor that is mounted on an automobile and is connected to a driving system electronic control unit that controls an engine, a steering wheel, a brake, or the like, a vehicle body system electronic control unit that controls a meter, a power window, or the like, and a safety control system electronic control unit that performs control for preventing collision with an obstacle or a pedestrian.

The learning target data storage portion 102 stores the learning target data acquired by the signal acquisition portion 101. Then, the stored learning target data is input to the normal model generation portion 106 described later. Further, the monitoring target data storage portion 103 stores the monitoring target data acquired by the signal acquisition portion 101. Then, the stored monitoring target data is input to the abnormality degree calculation portion 108 described later. These storage portions are assumed to be a hard disk (HDD), a flash memory, or the like. However, these storage portions may be a random access memory (RAM). Further, the storage portions may be a volatile memory or a non-volatile memory.

The state observer generation portion 104 generates the state observer by using a variable in a "variable configuration". The state observer is also called an observer or a soft sensor. The variable is a variable corresponding to the learning target data and the monitoring target data that are acquired by the signal acquisition portion 101. When the state observer generation portion 104 has an input means (corresponding to "input portion"), based on knowledge of a setter, the state observer may input a variable configuration necessary or useful for expressing a device function or a malfunction mechanism. Specific examples of the state observer and the variable forming the state observer will be described later. Here, the "variable configuration" is one variable or a combination of multiple variables.

The state observer generation portion 104 generates the state observer by linearly combining variables in the input variable configuration, for example, as shown in a first equation. An initial value of a coefficient a is set to a random value, the combination is performed using the learning target data, and an initial state of the state observer is generated.

[First Equation]

$$a_p x_p = a_{p1} x_{p1} + a_{p2} x_{p2} + \ldots a_{pn} x_{pn} \quad (1)$$

a: coefficient, x: variable, p: state observer number, n: variable number $a_p X_p$: p-th state observer (state observation value)

It is desirable that the state observer "reflects" the function of a device to be detected by the abnormality detection device 100 or a "device malfunction mechanism". Examples of the device function include driving that is a function of an automobile and an air-fuel ratio that is a function of the automobile. In the present embodiment, the examples will be described. Further, the examples of the device malfunction mechanism include, for example, a mechanism of overheating of an engine. The overheating of the engine is a mechanism in which a temperature rises due to an abnormality in a cooling system or an overload of the engine and an engine seizure occurs. Here, the "device malfunction mechanism" is a mechanism in which the device malfunction occurs. Further, the reflecting means that the state observation value output from the state observer in accordance with the device function or the device malfunction mechanism changes.

It is desirable that the variable in the variable configuration of the state observer is the function of the device to be detected by the abnormality detection device 100 or a "factor" of the device malfunction mechanism. For example, in a case of the overheating of the engine described as the example of the device malfunction mechanism, the engine temperature is a direct factor causing the overheating. The engine rotation speed or the amount of coolant is a direct factor causing the engine temperature to rise, that is an indirect factor causing the overheating. Examples of the factor of the device function are described below as the present embodiment. Here, the "factor" is a fact that affects the device function or the device malfunction mechanism.

Figure 2:
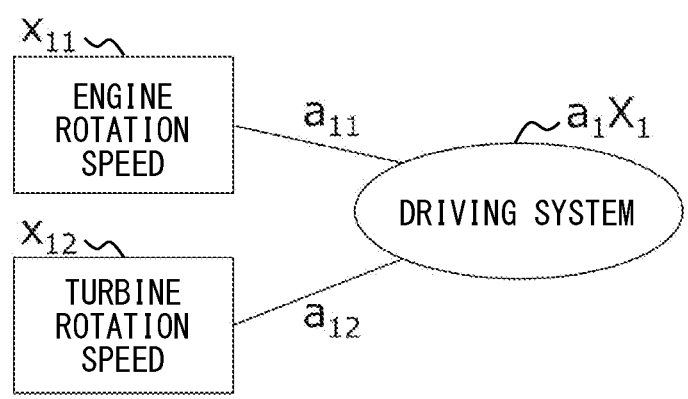
FIG. 2 is an explanatory diagram illustrating a state observer of the abnormality detection device of the embodiment.
Figure 2:
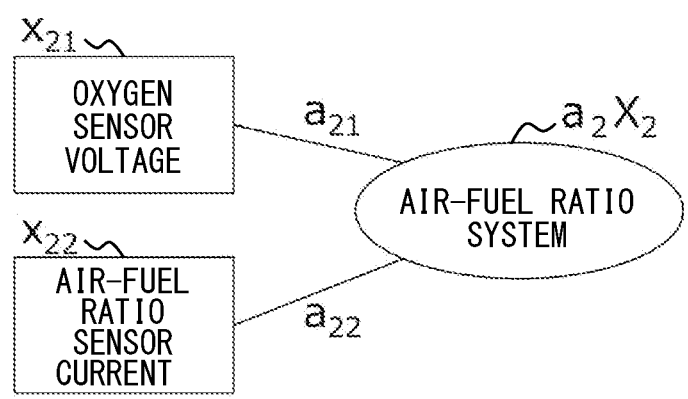

Hereinafter, an example of the state observer based on the function of the automobile will be described. For example, as shown in FIG. 2, when a driving system state observer (corresponding to a "first state observer") for a driving system of the automobile is generated, variables related to the driving system of the automobile, for example, an engine rotation speed ($x_{11}$) and a turbine rotation speed ($x_{12}$) are linearly combined. Thereby, the state observer of a second equation is generated.

[Second Equation]

$$u = a_1 X_1 = a_{11} x_{11} + a_{12} x_{12} \quad (2)$$

$a_{11}, a_{12}$: initial value of coefficient
u: driving system state observation value For example, as shown in FIG. 2, when an air-fuel ratio system state observer (corresponding to a "second state observer") for a ratio of air to fuel supplied to the engine is generated, variables related to the air-fuel ratio of the engine, for example, an oxygen sensor voltage ($x_{21}$) and an air-fuel ratio sensor current ($x_{22}$) are linearly combined. Thereby, a state observer of a third equation is generated.

[Third Equation]

$$v = a_2 X_2 = a_{21} x_{21} + a_{22} x_{22} \quad (3)$$

$a_{21}, a_{22}$: initial value of coefficient
v: air-fuel ratio system state observation value Of course, variables other than these variables may be used. Further, the number of variables to be combined is not limited to two. Furthermore, the number of state observers is not limited to two. For example, one state observer may be used, or a third and subsequent state observers (corresponding to a "third state observer") may be generated.

In the present embodiment, as the example of the state observer, the state observer having the two-layer structure of input and output has been me. However, the number of layers may be three or more. In this case, it may be described using a hierarchical neural network. Alternatively, it may be described using a kernel space. Further, regularization terms may be introduced.

The example in which the variables as the state observer are linearly combined has been described. However, it is not limited to this. The state observer may be configured by non-linear combination. For example, when it is described using the hierarchical neural network, a sigmoid function is used. Therefore, the state observer is configured by the non-linear combination.

It is possible to estimate the state observation value that cannot be measured directly by the sensor and the like by generating the state observer. Further, it is possible to improve the detection accuracy of the malfunction and easily analyze the malfunction factor by reflecting the device function or the malfunction mechanism on the state observer.

A distribution conversion that brings the learning target data used when the state observer generation portion 104 generates the state observer to a normal distribution may be performed. Examples of the distribution conversion include a Box-Cox conversion, a Johnson conversion, and the like. In such a manner, there is a possibility that an abnormality detection accuracy of the determination portion 109 described later is improved. When the distribution is performed, a distribution conversion parameter is stored in the state observer information storage portion 105 described later, and output to the normal model generation portion 106 and the abnormality degree calculation portion 108. Then, the similar distribution conversion is performed on the learning target data input to the normal model generation portion 106 and the monitoring target data input to the abnormality degree calculation portion 108.

Figure 3:
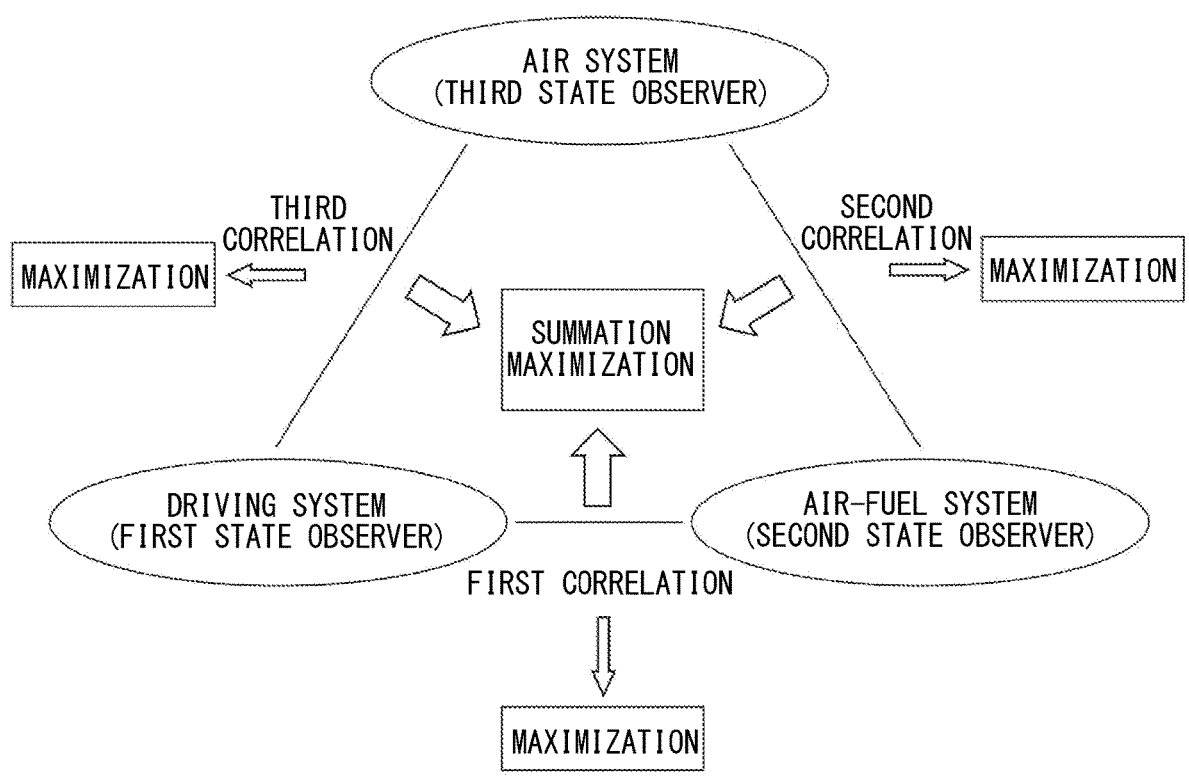
FIG. 3 is an explanatory diagram illustrating a process of a state observer generation portion of the abnormality detection device of the embodiment.

When the number of state observers is plural, as shown in FIG. 3, it is desirable to further maximize the correlation between the state observers. For example, when the state observer consists of the first state observer and the second state observer, the correlation between the first state observer and the state observer is maximized under a constraint condition. When the state observer consists of three or more state observers, each correlation between two state observers of any combination is maximized under the constraint condition. Thereby, since a variation range due to noise of normal data is limited, it is possible to improve the accuracy if abnormality detection.

Specifically, as shown in the first line of a fourth equation, it is possible to maximize the correlation by adjusting two coefficients. The numerator of the fourth equation is a sample covariance of the first state observer and the second state observer. The denominators are sample variances of the first state observer and a sample variance of the second state observer. The second line of the fourth equation is a constraint condition of the Lagrange's undetermined multiplier method, and is 1 in the case of the present embodiment.

[Fourth Equation]

$$\rho(a_n, a_m) = \frac{a_n^T V_{xnxm} a_m}{\sqrt{a_n^T V_{xnxn} a_n} \sqrt{a_m^T V_{xmxm} a_m}} \quad (4)$$

Subject to the Constrains $$a_n^T V_{xnxn} a_n = a_n^T X_n^T X_n a_n = a_m^T V_{xmxm} a_m = a_m^T X_m^T X_m a_m = 1$$

ρ: correlation
n: n-th state observer
m: m-th state observer
a: coefficient
V: variance Further, when the state observer consists of three state observers of the first state observer, the second state observer, and the third state observer, as shown in FIG. 3, it is desirable to maximize the "sum" of correlation between two state observers. Also in the case of the four or more state observers, maximization is performed in the similar manner to the manner in the case of three. Thereby, since a variation range due to noise of normal data is limited, it is possible to improve the accuracy if abnormality detection. Here, the "sum" may include the sum in the calculation, such as the sum of squares and the sum of absolute values, in addition to the simple sum.

Specifically, as shown in a fifth equation, it is possible to maximize the sum of the correlation between the two state observers. The g is a function representing the sum. The inside of parentheses is a target to be summed, that is, a correlation between the n-th state observer and the m-th state observer.

[Fifth Equation]

$$\text{Maximize}(a_1, \ldots a_N) \sum_{n,m=1, n \neq m}^{N} g(a_n^T X_n^T X_m a_m) \quad (5)$$

N: total number of state observers

The state observer information storage portion 105 stores coefficients calculated by the state observer generation portion 104, the coefficients being coefficients ($a_{11}$, $a_{12}$) of the driving system state observer and coefficients ($a_{21}$, $a_{22}$) of the air-fuel ratio system state observer in the present embodiment. The coefficients are obtained by maximizing the correlation. Further, the variable configuration of the state observer is also stored.

The state observer generation portion 104 is required to be provided when the state observer is generated. Once the state observer is generated and the variable configuration of the state observer and the coefficient of the state observer are stored in the state observer information storage portion 105, the state observer information storage portion 105 may be separated from the abnormality detection device 100.

The normal model generation portion 106 "combines" the first state observation value obtained by input of the learning target data to the state observer and the learning target data and inputs the combined result to a competitive neural network to generate a normal model. In the case of the present embodiment, the variable configuration of the state observer and the coefficient are read from the state observer information storage portion 105. The learning target data read from the learning target data storage portion 102 is applied to the variable, so that the first state observation value is calculated. For example, the engine rotation speed and the turbine rotation speed that are acquired as the learning target data are input to the second equation, and a driving system state observation value ($u_1$) (corresponding to the "first state observation value") is calculated. Further, the oxygen sensor voltage and the air-fuel ratio current that are acquired as the learning target data are input to the third equation, and an air-fuel ratio system state observation value ($v_1$) (corresponding to the "first state observation value") is calculated. Then, six data including the engine rotation speed, the turbine rotation speed, the driving system state observation value ($u_1$), the oxygen sensor voltage, the air-fuel ratio sensor current, and the air-fuel ratio system state observation value ($v_1$) are input to a competitive neural network (NN). Here, the term of "combine" is sufficient as long as the first state observation value and the learning target data can be input to the competitive neural network at the same time.

When there are multiple combinations of attributes of, as the initial value given to the competitive neural network, input data such as, for example, the type of vehicle, measurement season, day and night, customized specifications, or the degree of aging, it is desirable to evenly sample the data. Alternatively, it is desirable to sample the data at random. Thereby, it is possible to accelerate the convergence at the time of learning a neuron weight vector on a map of the competitive neural network.

The competitive neural network is a neural network consisting of only the input layer and the output layer, and includes multiple input layer neurons and multiple output layer neurons fully connected to the input layer neurons.

The present embodiment calculates the abnormality degree that is a difference between the learning target data and the state observation value, which are input to the competitive neural network, and neuron weight data of a winning unit. Then, a threshold is calculated using the set of differences. For example, a constant multiple of a quantile of 99.9% of the set of differences (absolute values) is used as the threshold.

The normal model parameter storage portion 107 stores the threshold calculated by the normal model generation portion 106.

The abnormality degree calculation portion 108 "combines" the second state observation value obtained by input of the monitoring target data to the state observer and the monitoring target data and inputs the combined result to the competitive neural network to calculate the abnormality degree with use of the weight data of the output layer neuron. In the case of the present embodiment, the variable configuration of the state observer and the coefficient are read from the state observer information storage portion 105. The monitoring target data read from the monitoring target data storage portion 103 is applied to the variable, so that the second state observation value is calculated. When the distribution conversion is performed on the learning target data at the time of generating the state observer, the distribution conversion parameter is read from the state observer information storage portion 105, and the distribution conversion is performed on the monitoring target data.

For example, the engine rotation speed and the turbine rotation speed that are acquired as the monitoring target data are input to the second equation, and a driving system state observation value ($u_2$) (corresponding to the "second state observation value") is calculated. Further, the oxygen sensor voltage and the air-fuel ratio current that are acquired as the monitoring target data are input to the third equation, and an air-fuel ratio system state observation value ($v_2$) (corresponding to the "second state observation value") is calculated. Then, six data including the engine rotation speed, the turbine rotation speed, the driving system state observation value ($u_2$), the air-fuel ratio sensor current, and the air-fuel ratio system state observation value ($v_2$) are input to the competitive neural network (NN). Here, the term of "combine" is sufficient as long as the second state observation value and the monitoring target data can be input to the competitive neural network at the same time.

The abnormality degree is calculated based on the difference value between the monitoring target data and the state observation value, which are input to the competitive neural network, and the weight data of each output layer neuron.

Figure 4:
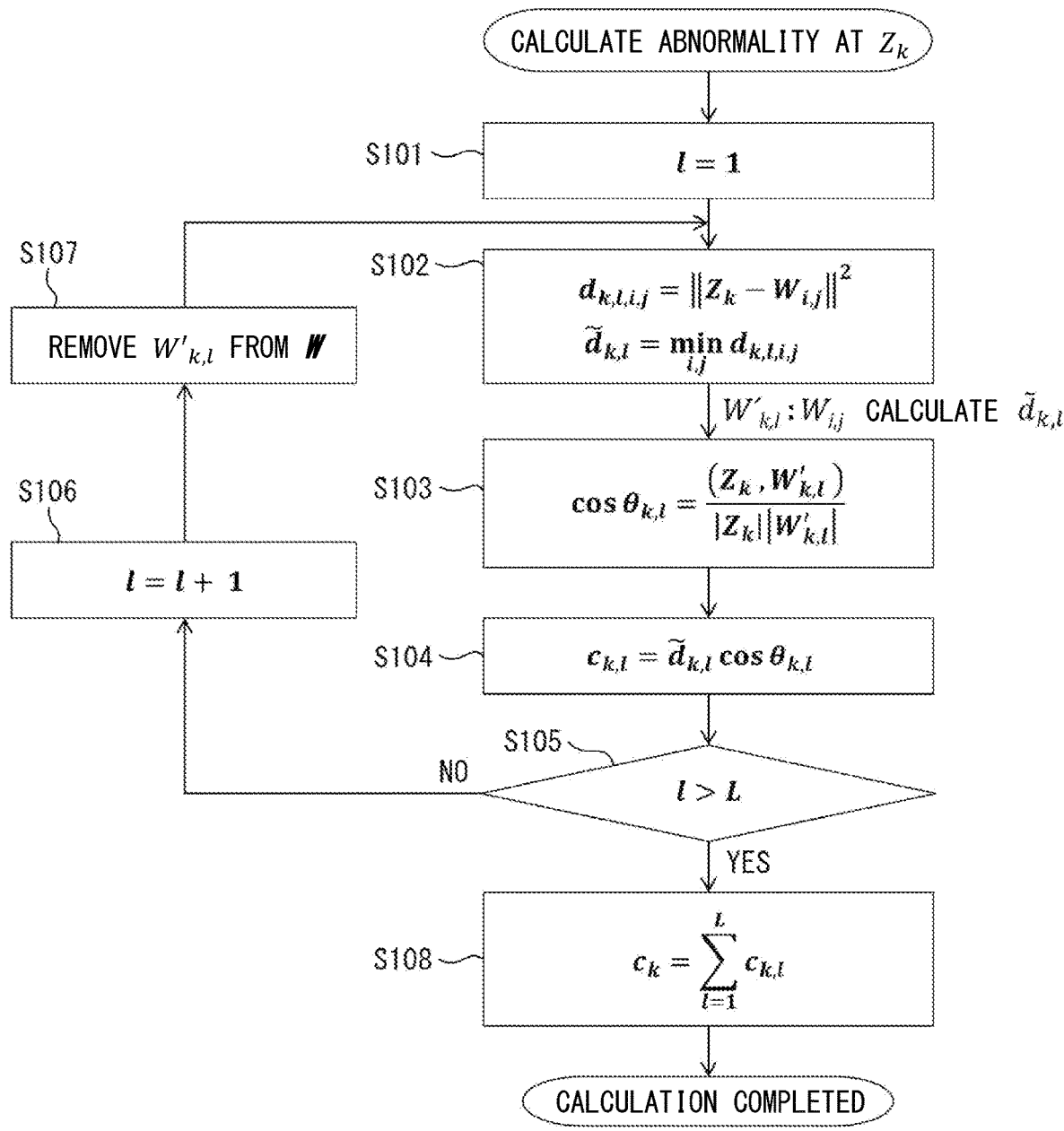
FIG. 4 is a flowchart illustrating operation of an abnormality degree calculation portion of the abnormality detection device of the embodiment.

Hereinafter, a procedure for calculating the abnormality degree in the abnormality degree calculation portion 108 will be described with reference to FIG. 4.

The meanings of the symbols in the figure are as follows.
W: neuron set
k: monitoring time
l: loop counter
L: number of loops
j: neuron address of neural network The loop counter (l) is set to 1 (S101). The minimum Euclidean distance ($d\sim_{k,l}$) between the monitoring target data ($Z_k$) at the monitoring time (k) and the weight data ($W_{i,j}$) of the neural network neuron closest to the monitoring target data is calculated (S102). The symbol "d~" in the present specification means d with a tilde. A cosine similarity ($\cos \theta_{k,l}$) between the monitoring target data ($Z_k$) and weight data ($W'_{k,l}$) of the neural network neuron close to the monitoring target data is calculated (S103). An abnormality degree ($c_{k,l}$) is calculated from the minimum Euclidean distance ($d\sim_{k,l}$) and the cosine similarity ($\cos \theta_{k,l}$) (S104). When the loop counter (l) does not exceed the predetermined loop number (L) (S105: N), the loop counter (l) is incremented (S106). A neuron ($W_{i,j}$ corresponding to $W'_{k,l}$) closest to the monitoring target data is removed from the neuron set (W) (S107), and the process returns to S102. When the loop counter (l) exceeds the loop number (L) (S105: Y), the sum of the abnormality degrees for the predetermined loop number (L) is set to the abnormality degree ($c_k$) (S108). The loop number (L) can be arbitrarily set, and is, for example, 10 times.

In preparation for analyzing the factor by the factor analysis portion 110 in order to specify the cause of the abnormality, a value of $f_k$ in a sixth expression, that is, a value, which is obtained by taking the square root of a squared value of a difference vector between the monitoring target data ($Z_k$) used at the time of calculation of the abnormality degree ($c_{k,l}$) and the weight neuron ($W_{k,l}$) selected at the time of l equal to 1 (l=1), may be stored in a separately provided storage portion. The s is a value that specifies the monitoring target data or the state observation value, and is equal to or higher than 1 and equal to or lower than S ($1 \leq s \leq S$). The S is the total number of the monitoring target data and the state observation values.

[Sixth Equation]

$$f_k = \sqrt{|f_k - W'_{k,1}|} \qquad (6)$$
$$f_k = (f_{k,1}, f_{k,2}, \ldots, f_{k,S})^T$$

The determination portion 109 calculates the determination result by comparing the threshold read from the normal model parameter storage portion 107 with the abnormality degree ($c_k$) output from the abnormality degree calculation portion 108. Specifically, when the abnormality degree is equal to or higher than the threshold, a determination result that there is the abnormality is output. When the abnormality degree is less than the threshold, a determination result that there is no abnormality is output.

When the determination result of the determination portion 109 indicates the "abnormality", the factor analysis portion 110 specifies the cause of the "abnormality" by using the second state observation value and the monitoring target data that cause the determination of the "abnormality". The factor analysis portion 110 may specify the cause of the abnormality by using a second state observation value and a monitoring target data that are earlier or/and later in time than the second state observation value and the monitoring target data that cause the determination of the abnormality. In the present embodiment, specifying the cause of the abnormality is referred to as the factor analysis. Here, the "abnormality" includes not only an abnormality but also a sign of the abnormality.

For example, in the present embodiment, the abnormality cause is specified using 11 data including one data having the second state observation value and the monitoring target data that are determined to be abnormal, 5 data earlier than the one data, and 5 data later than the one data. When, at the monitoring time (k), the determination indicates the abnormality, the $f_k$, which is shown in the sixth equation and calculated by the abnormality degree calculation portion 108, five values earlier than the $f_k$, five values later than the $f_k$ are read from the separately provided storage portion to be set to F. The s is a value that specifies the monitoring target data or the state observation value, and is equal to or higher than 1 and equal to or lower than S ($1 \leq s \leq S$). The S is the total number of the monitoring target data and the state observation values. In the present embodiment, the s is associated as follows.

s=1: engine rotation speed
s=2: turbine rotation speed
s=3: driving system state observation value ($u_2$)
s=4: oxygen sensor voltage
s=5: air-fuel ratio sensor current
s=6: air-fuel ratio system state observation value ($v_2$)

[Seventh Equation]

$$F = \begin{bmatrix} f_{-5,1} & \cdots & f_{-5S} \\ \vdots & \ddots & \vdots \\ f_{5,1} & \cdots & f_{5S} \end{bmatrix} \qquad (7)$$

As described above, the F includes each abnormality degree of the state observer and each abnormality degree of the monitoring target data. When, in the factor analysis, the factor that contributes to the abnormality degree is analyzed with use of only a small number of monitoring target data, accurate analysis is difficult due to the noise. Further, it is difficult to determine which of the functional blocks representing the functions of the monitored device has a factor. Therefore, in the present embodiment, it is possible to provide a robust approach against the noise by analyzing the state observation values that are, in the present embodiment, a state observation value of s=3 and a state observation value of s=6 with use of multiple measurement points.

When the sum $f_{all}$ of the $f_{k,s}$ that is a value calculated from each state observer shows the overall abnormality tendency, a similarity $y_s$ with each state observer can be calculated by an equation (9). The f' indicates a deviation vector from the average. In the eighth equation, the sum of only the values obtained from the state observer is calculated. However, in the present embodiment, the sum of two cases of s=3 and s=6 is calculated.

[Eighth Equation]

$$f_{all} = \sum_{S}^{T} f_{k,S} \quad (8)$$

$$\gamma_s = \frac{(f'_{all}, f'_S)}{\|f'_{all}\|\|f'_S\|} \quad (9)$$

As shown in the equation (9), the abnormality degree of each state observer and the overall abnormality tendency are compared in the form of similarity. The functional block of the device corresponding to the state observer s having the maximum absolute value of the similarity $y_s$ is estimated as the functional block in which the cause of the abnormality occurs.

As a method for examining the similarity, in the present embodiment, the Pearson product-moment correlation of the equation (9) is used. However, the cosine similarity, the Spearman's rank correlation coefficient, the Kendall rank correlation coefficient, a cross-correlation function, DTW, a KL distance, and the like may be used. Further, the relationship between the $f_{all}$ and the $f_{k,s}$ may be regarded as a graphical model, and regularization may be introduced to eliminate spurious correlations or weak correlations.

Further, the similarity between the overall abnormality tendency $f_{all}$ and the abnormality degree $f_{k,s}$ of the actual sensor or the control input value may be calculated for performing the analysis factor including not only the functional block but also the actual sensor or the control input value that causes the abnormality. That is, in the present embodiment, the similarity $y_s$ may be calculated also in a case of s=1, a case of s=2, a case of s=4, and a case of s=5.

Figure 5:
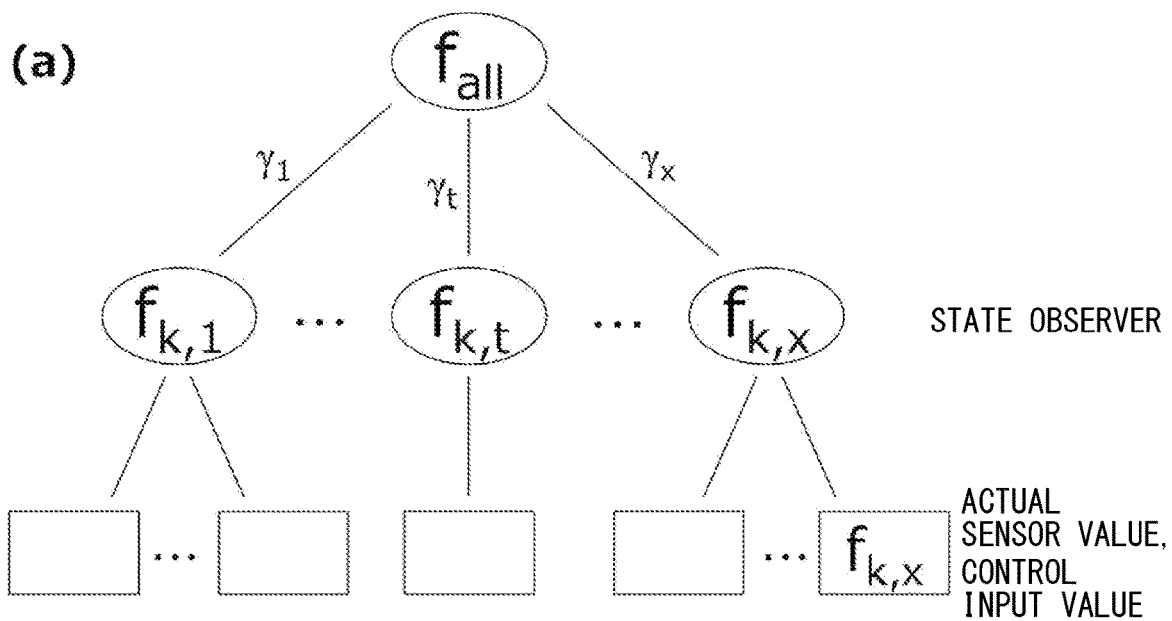
FIG. 5 is an explanatory diagram illustrating information displayed on a display portion of the abnormality detection device of the embodiment.
Figure 5:
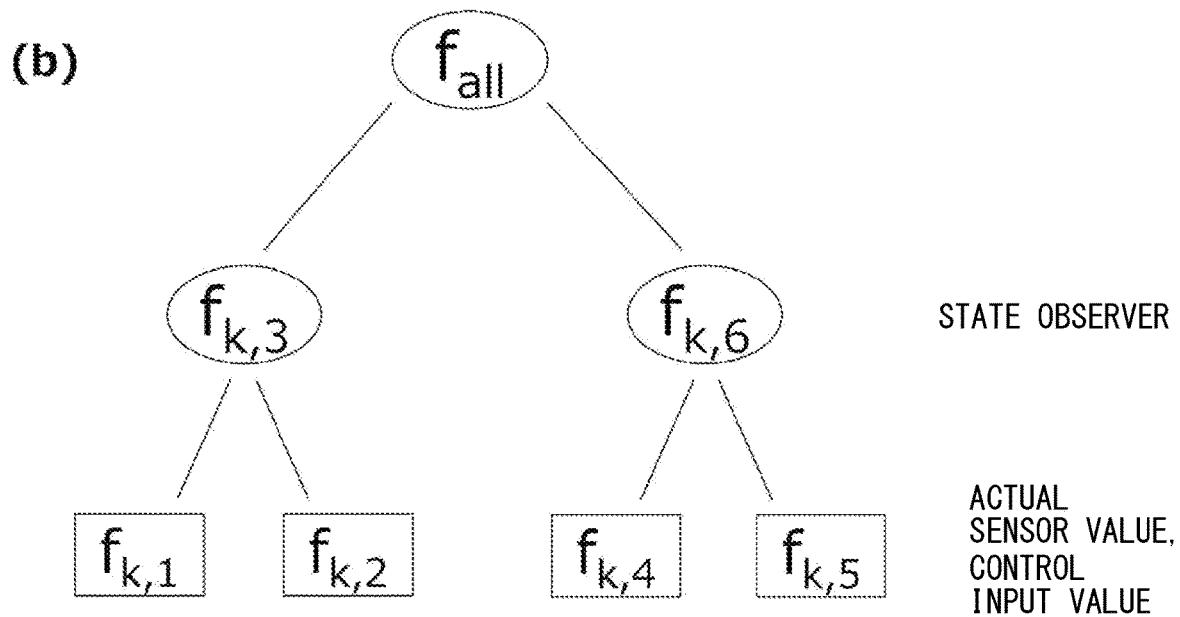

Information for specifying the cause of the abnormality is, in the present embodiment, the similarity $y_s$ and information related to the similarity, and may be displayed on the display portion 111. A part (a) of FIG. 5 shows information displayed on the display portion 111. According to this information, since the overall abnormality tendency fall, the abnormality degree $f_{k,s}$ of each state observer, the abnormality degrees $f_{k,s}$ of the actual sensors or the control input value are displayed, and these similarities $y_s$ are displayed, it is possible to visually specify the functional, the actual sensor, or the like that causes the abnormality. Further, in order to sort the display contents and prevent unnecessary information from being displayed, display by a drill-down or a roll-up may be adopted. A part (b) of FIG. 5 is a display example in the present embodiment.

2. Operation of Abnormality Detection Device

Figure 6:
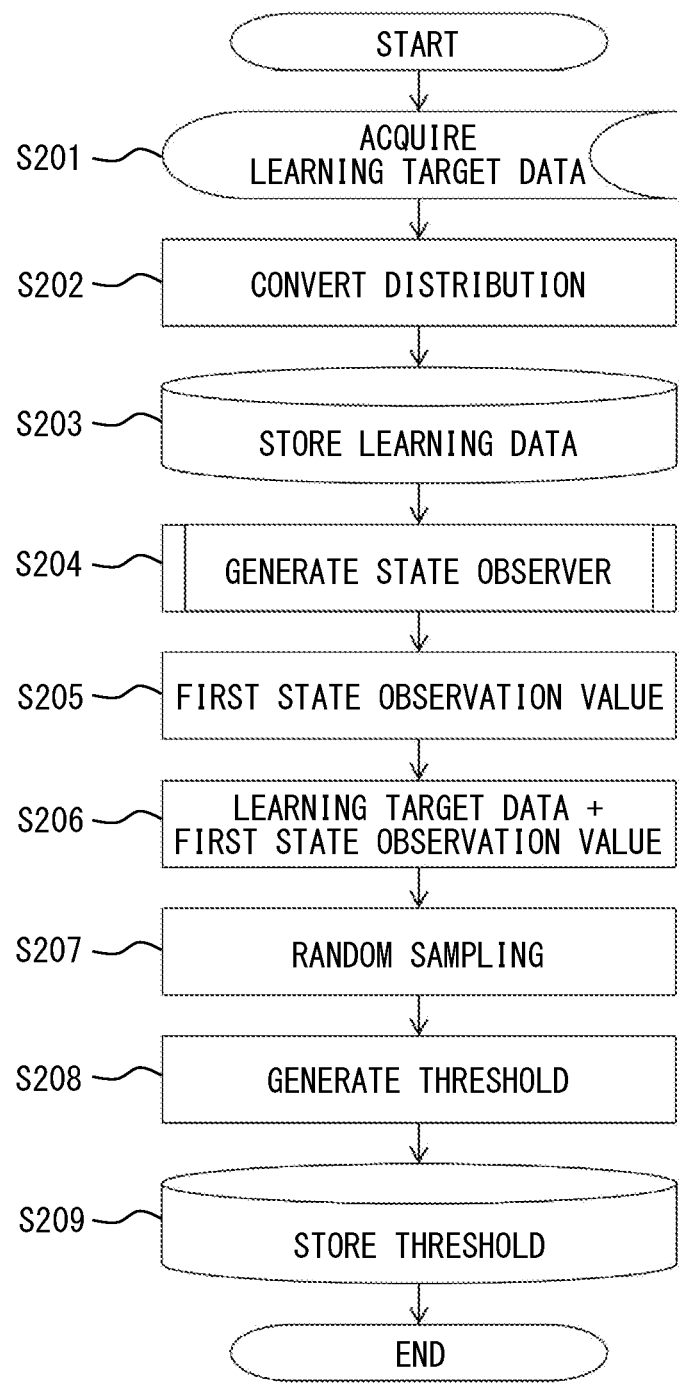
FIG. 6 is a flowchart illustrating an operation during learning of the abnormality detection device of the embodiment.
Figure 7:
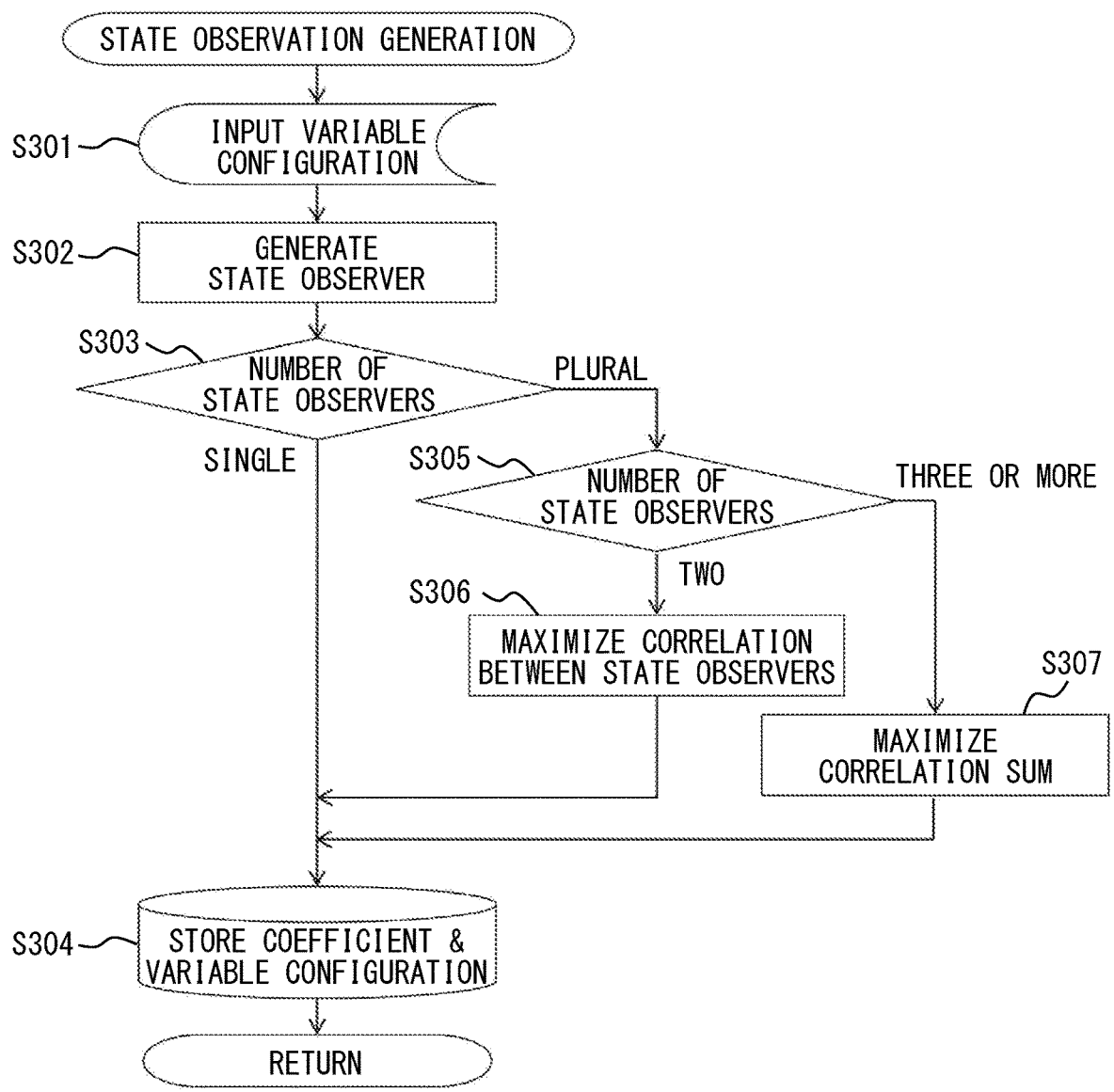
FIG. 7 is a flowchart illustrating a generation operation of the state observer of the abnormality detection device of the embodiment.
Figure 8:
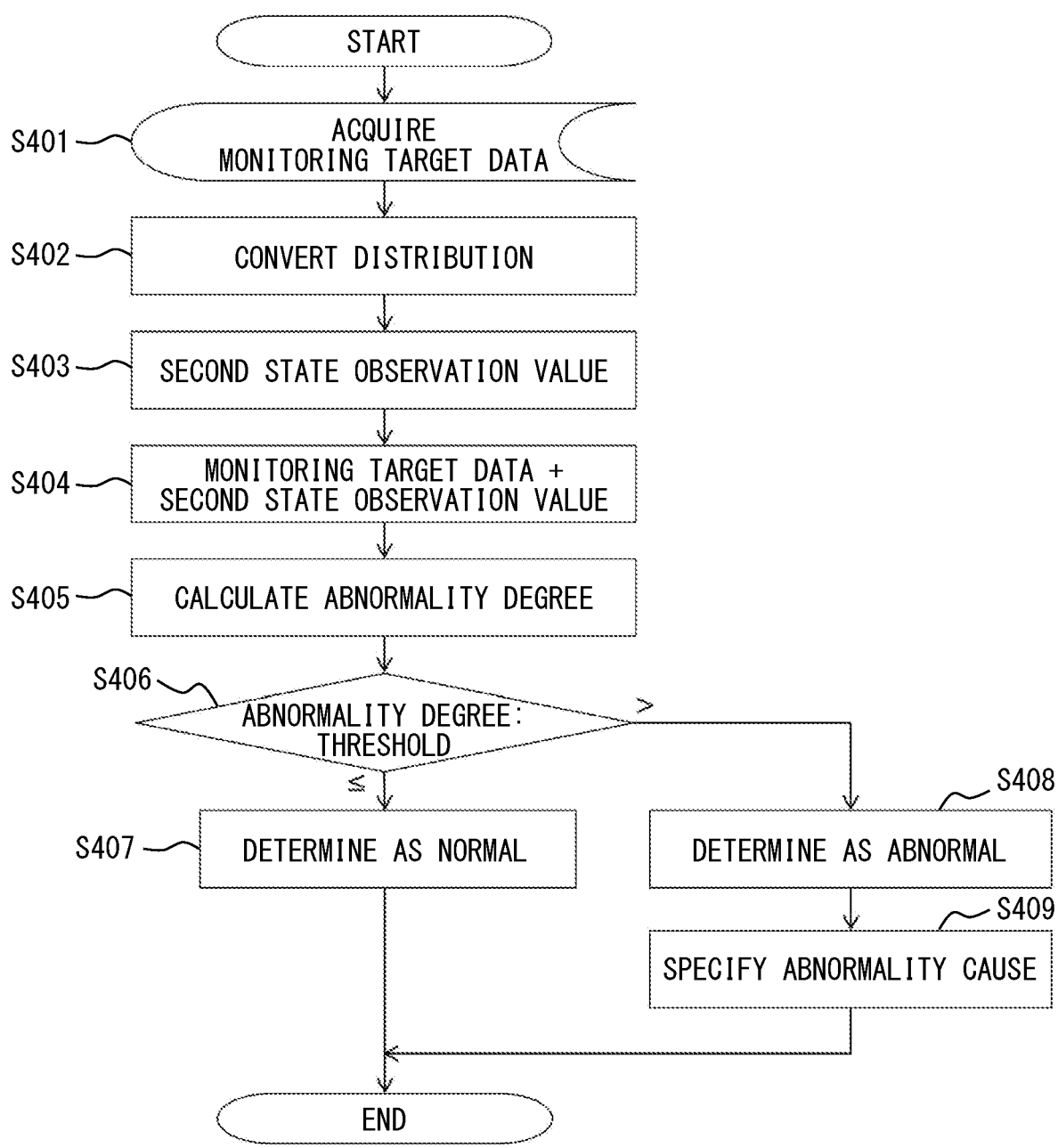
FIG. 8 is a flowchart illustrating an operation during monitoring and factor analysis of the abnormality detection device of the embodiment.

Next, the operation of the abnormality detection device 100 in the present embodiment will be described with reference to FIGS. 6 to 8. In the flow of FIGS. 6 to 8, when a process or determination in the latter stage does not presuppose a process or determination in the earlier stage, the order of the earlier state and the latter stage can be changed. Further, FIGS. 6 to 8 shows not only the abnormality detection method of the abnormality detection device 100 but also a process procedure of a program executed by the abnormality detection device 100.

(1) Operation During Learning

FIG. 6 is a flowchart showing operation during learning of the abnormality detection device 100. The signal acquisition portion 101 acquires the learning target data from various sensors and the like (S201). The signal acquisition portion 101 performs distribution conversion on the learning target data (S202). The learning target data storage portion 102 stores the learning target data after the distribution conversion (S203). The state observer generation portion 104 generates the state observer by using a variable in the input variable configuration (S204). The generation of the state observer will be described separately as a subroutine process with reference to FIG. 7. The normal model generation portion 106 calculates the first state observation value obtained by the learning target data input to the state observer (S205). The normal model generation portion 106 combines the first state observation value and the learning target data (S206). The normal model generation portion 106 performs random sampling based on a combination of combined data of the first state observation value and the learning target data (S207). The competitive neural network of the normal model generation portion 106 generates the threshold based on the first state observation value and the learning target data (S208). The normal model parameter storage portion 107 stores the threshold of the normal model (S209).

(2) Generation Operation of State Observer

FIG. 7 is a flowchart of the subroutine showing the state observer generation operation by the state observer generation portion 104 of the abnormality detection device 100. The variable configuration is input to the state observer generation portion 104 (S301). The state observer generation portion 104 sets the coefficients to the initial value by using the variable in the input variable configuration, and generates the state observer by combining the learning target data (S302). The state observer generation portion 104 determines whether the number of generated state observers is singular or plural (S303). When the number is singular, the coefficient of the state observer and the variable configuration are stored in the state observer information storage portion 105 (S304), and the process ends. When the number is plural, the process shifts to S305. The state observer generation portion 104 determines whether the number of generated state observers is two, or three or more (S305). When the number is two, the process shifts to S306. When the number is three, the process shifts to S307. When the number of generated state observers is two, the state observer generation portion 104 maximizes the correlation between the two state observers (S306), and the process shifts to S304. When the number of generated state observers is three or more, the state observer generation portion 104 maximizes the sum of correlations between the two state observers (S307), and the process shifts to S304.

(3) Operations During Monitoring and Factor Analysis

FIG. 8 is a flowchart showing operations of the abnormality detection device 100 during monitoring and the factor analysis. The signal acquisition portion 101 acquires the monitoring target data from the various sensors and the like (S401). The signal acquisition portion 101 reads the distribution conversion parameter from the state observer information storage portion 105, and performs the distribution conversion on the monitoring target data (S402). The abnormality degree calculation portion 108 calculates the second state observation value obtained from the monitoring target data input to the state observer (S403). The abnormality degree calculation portion 108 combines the second state observation value and the monitoring target data (S404). The competitive neural network of the abnormality degree calculation portion 108 calculates the abnormality degree from the combined data (S405). The determination portion 109 calculates the determination result by comparing the threshold read from the normal model parameter storage portion 107 with the abnormality degree output from the abnormality degree calculation portion 108 (S406). When the abnormality degree is equal to or less than the threshold, a determination result of normality is output (S407). When the abnormality degree is equal to or higher than the threshold, a determination result of abnormality is output (S408). When the determination result of the determination portion 109 indicates the abnormality (S408), the factor analysis portion 110 specifies the cause of the abnormality by using the second state observation value and the monitoring target data that cause the determination of the abnormality (S409).

CONCLUSION

The features of the abnormality detection device according to the embodiment of the present disclosure have been described above.

Since the terms used in each embodiment are examples, the terms may be replaced with terms that are synonymous or include synonymous functions.

The block diagram used for the description of the embodiment is obtained by classifying and arranging the configurations of the abnormality detection device for each function. These functional blocks are realized by any combination of hardware or software. Further, since the functions are shown, the block diagram can be understood as disclosure of the method and the program that implement the method.

Order of functional blocks that can be grasped as processing, a sequence, and a method described in relation to each embodiment may be changed unless some restriction is imposed, for example, a result from one step is utilized at another step.

The terms of "first" and "second" used in the description of each embodiment and claims are for discriminating two or more configurations and methods of the same kind and do not limit order or superiority or inferiority.

In the embodiment described above, the case where the abnormality detection device of the present disclosure is mounted on the vehicle, that is, a case of the in-vehicle device has been described. However, the abnormality detection device may be mounted on a device other than the vehicle, or may be connected to the device.

Examples of the abnormality detection device include a malfunction diagnosis tool. However, the abnormality detection device is not limited to the mode or name. Examples of the abnormality detection device include, as parts or semi-finished products, a semiconductor, an electronic circuit, a module, or an ECU (electronic control unit). Further, the examples include, as finished products, a drive recorder, a car navigation system, a smartphone, a personal computer, a mobile phone, and a mobile information terminal.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, processor, memory, or the like, capable of executing the program.

A program may be stored in a non-transitory tangible storage medium including an external storage (for example, hard disk, USB memory, CD/BD), or an internal storage (for example, RAM, ROM) in a special-purpose or general-purpose hardware (for example, computer). Such a program may be downloaded to the storage medium in the hardware via a communication link from a server. As a result, it is possible to always provide a latest function by updating the program.

INDUSTRIAL APPLICABILITY

The abnormality detection device according to the present disclosure can be used not only for in-vehicle use but also for abnormality detection of various devices.

The invention claimed is:

1. An abnormality detection device comprising:
a signal acquisition portion configured to acquire learning target data and monitoring target data, the learning target data is data used for machine learning and the monitoring target data is data of a monitoring target;
a state observer generation portion configured to generate a state observer by using a variable in an input variable configuration;
a normal model generation portion configured to generate a threshold by combining a first state observation value obtained by input of the learning target data to the state observer and the learning target data and inputting a combined result to a competitive neural network;
an abnormality degree calculation portion configured to calculate an abnormality degree by combining a second state observation value obtained by input of the monitoring target data to the state observer and the monitoring target data and inputting a combined result to the competitive neural network; and
a determination portion configured to calculate a determination result by comparing the threshold with the abnormality degree, wherein
the abnormality degree is a difference between the learning target data and the second state observation value, which are input to the competitive neural network, and neuron weight data of a winning unit of the competitive neural network.

2. The abnormality detection device according to claim 1, wherein:
the state observer is configured to reflect a function of a device to be detected by the abnormality detection device or a malfunction mechanism of the device.

3. The abnormality detection device according to claim 1, wherein:
the variable in the variable configuration is a function of a device to be detected by the abnormality detection device or a factor of a malfunction mechanism of the device.

4. The abnormality detection device according to claim 1, wherein:
the state observer generation portion is configured to generate the state observer by linearly combining the variable in the variable configuration and inputting the learning target data.

5. The abnormality detection device according to claim 1, further comprising:
an input portion configured to input the variable configuration.

6. The abnormality detection device according to claim 1, wherein:
the state observer includes a first state observer and a second state observer; and
a correlation between the first state observer and the second state observer is maximized.

7. The abnormality detection device according to claim 1, wherein:
the state observer includes a first state observer, a second state observer, and a third state observer; and
a sum of a first correlation between the first state observer and the second state observer, a second correlation between the second state observer and the third state observer, and a third correlation between the third state observer and the first state observer is maximized.

8. The abnormality detection device according to claim 6, wherein:
the first state observer is a driving system state observer for a driving system of an automobile;
the second state observer is an air-fuel ratio system state observer for a ratio of air and fuel supplied to an engine;
the variable configuration of the driving system state observer includes, as the variable, an engine rotation speed and a turbine rotation speed; and
the variable configuration of the air-fuel ratio system state observer includes, as the variable, an oxygen sensor voltage and an air-fuel ratio sensor current.

9. The abnormality detection device according to claim 7, wherein:
the first state observer is a driving system state observer for a driving system of an automobile;
the second state observer is an air-fuel ratio system state observer for a ratio of air and fuel supplied to an engine;
the variable configuration of the driving system state observer includes, as the variable, an engine rotation speed and a turbine rotation speed; and
the variable configuration of the air-fuel ratio system state observer includes, as the variable, an oxygen sensor voltage and an air-fuel ratio sensor current.

10. The abnormality detection device according to claim 1, further comprising:
a factor analysis portion configured to specify a cause of an abnormality by using the second state observation value and the monitoring target data that cause determination indicating abnormality when the determination result indicates the abnormality.

11. The abnormality detection device according to claim 10, wherein:
the factor analysis portion is configured to specify the cause of the abnormality by further using the second state observation value and the monitoring target data that are earlier or later in time than the second state observation value and the monitoring target data that cause the determination of the abnormality.

12. The abnormality detection device according to claim 10, further comprising:
a display portion configured to display information for specifying the cause of the abnormality.

13. An abnormality detection method comprising:
acquiring learning target data, the learning target data is data used for machine learning;
generating a state observer by using a variable in an input variable configuration;
generating a threshold by combining a first state observation value obtained by input of the learning target data to the state observer and the learning target data and inputting a combined result to a competitive neural network;
acquiring monitoring target data, the monitoring target data is data of a monitoring target;
calculating an abnormality degree by combining a second state observation value obtained by input of the monitoring target data to the state observer and the monitoring target data and inputting a combined result to the competitive neural network; and
calculating a determination result by comparing the threshold with the abnormality degree, wherein
the abnormality degree is a difference between the learning target data and the second state observation value, which are input to the competitive neural network, and neuron weight data of a winning unit of the competitive neural network.

14. A computer-readable non-transitory storage medium storing an abnormality detection program configured to cause a computer to:
acquire learning target data, the learning target data is data used for machine learning;
generate a state observer by using a variable in an input variable configuration;
generate a threshold by combining a first state observation value obtained by input of the learning target data to the state observer and the learning target data and inputting a combined result to a competitive neural network;
acquire monitoring target data, the monitoring target data is data of a monitoring target;
calculate an abnormality degree by combining a second state observation value obtained by input of the monitoring target data to the state observer and the monitoring target data and inputting a combined result to the competitive neural network; and
calculate a determination result by comparing the threshold with the abnormality degree, wherein
the abnormality degree is a difference between the learning target data and the second state observation value, which are input to the competitive neural network, and neuron weight data of a winning unit of the competitive neural network.

15. The abnormality detection device according to claim 1, wherein:
the signal acquisition portion, the state observer generation portion, the normal model generation portion, the abnormality degree calculation portion, and the determination portion correspond to a processor coupled to a memory.

16. The abnormality detection device according to claim 5, wherein:
the input portion corresponds to the processor.

17. The abnormality detection device according to claim 9, wherein:
the factor analysis portion is configured to specify the cause of the abnormality by further using the second state observation value and the monitoring target data that are earlier or later in time than the second state observation value and the monitoring target data that cause the determination of the abnormality.

* * * * *